Jan. 7, 1958 A. J. DETRIE ET AL 2,819,032
AIRCRAFT FUSELAGE HAVING PANEL DAMPING MATERIAL
Filed Oct. 20, 1953

INVENTORS
ARTHUR J. DETRIE
MATHA M. MILLER
EUGENE J. O'NEIL AND
PAUL J. STAYBOLDT
BY Edwin Coates
ATTORNEY

United States Patent Office 2,819,032
Patented Jan. 7, 1958

2,819,032

AIRCRAFT FUSELAGE HAVING PANEL DAMPING MATERIAL

Arthur J. Detrie, Santa Monica, and Eugene J. O'Neil, Paul J. Stayboldt, and Matha M. Miller, Los Angeles, Calif., assignors to Douglas Aircraft Company, Inc., Santa Monica, Calif.

Application October 20, 1953, Serial No. 391,604

(Filed under Rule 47(a) and 35 U. S. C. 116)

1 Claim. (Cl. 244—119)

This invention relates to laminated articles and aims primarily to provide a versatile laminated but flexible sheet material which will carry its own attaching means for use, among other things, as a facing-layer, or spot "liner," for attachment facewise to the central portion, preferably, of an expanse of rigid material that is subjected to certain undesirable influences in such a way as to minimize the effects of these influences.

Among such influences may be mentioned vibration-producing forces, conductive heat, and radiant energy heat and the present facing-layer damps the vibrations of vibratile panels to which it is attached, and minimizes heat transfer therethrough.

In its presently-preferred embodiment, the present material takes the form of a roll, or compactly convoluted expanse, of laminated, but severable, and self-attaching sheet-material, which, when rolled out against a panel or applied segmentally thereto, not only attenuates the sonic-vibration thereof and reduces their amplitude, but also serves as a thermal insulator and protective coating therefor. The one lamina of said sheet material is composed of a flowable, semi-liquid having a high internal molecular friction, high density, and high surface tension, while being pressurally adhesive. It is temporarily distortable in all three planes of space under the vibrations of the vibratile panel but is of an elastically deformable, or dimensionally recuperative, nature. This material is also preferably thermally non-conductive.

When self-attached facewise to a vibratile panel, this lamina primarily serves to absorb and dissipate the flexural vibrations of the panel's entire, or central, area, according to the extent of the lamina. This it does by the aforesaid temporary distortion, which action constitutes work. This working dissipates the vibratile energy of the panel without impairing the integrity or nature of the laminae and without the production of an appreciable amount of heat or entailing greatly thickening the cabin wall. Among the suitable products now on the market that have properties most closely corresponding to those required by the one lamina of the present concepts is the double-faced, pressurally-sensitive adhesive tape or sheet manufactured by Johnson and Johnson, of New Brunswick, New Jersey and generally consisting of synthetic rubber and resins dissolved in suitable petroleum solvents thereof.

The other lamina of the simplest form of the novel sheet-material is constituted by a sheet of thin, ductile and pliant, but semi-rigid, metallic material, which is thus non-flowable and non-adhesive. Preferably, it is thinned to such a degree of the order, of a few thousandths of an inch—as to be incapable of sustaining itself in unwrinkled planarity. That is, it will "buckle" or wrinkle under the slightest reasonable force. However, when employed in combination with the other elements of the invention, as hereinafter explained, it is adapted to resist the flexural and shear forces applied to it by the working of the damping laminae. Preferably, also, this lamina has bright or polished faces which are reflective of radiant heat energy and yet is so inert and non-reactive as to protect the damping laminae from oxidation and deterioration. This foil lamina may be either coextensive with the damping lamina, or non-coextensive therewith, as shown in the drawings. In the latter case, it occupies and confines a predetermined portion of the area thereof to which it is attached by means of the pressure-sensitive adhesive aforementioned. It thus not only serves as above, but as an area delimiting backing member, and distributor. In combination with the thermally non-conductive first-said lamina, this second layer, being metallic and bright enough to be reflective of radiant heat-energy, renders the novel sheet material, thermally, an insulator.

Any ductile, pliant light metallic material which can be thinned down to a "foil" is suitable for this second lamina. Aluminum alloy foil meets the present requirements very well, but the invention also contemplates the employment of other light-metallic foils, such as those composed of alloys of magnesium, beryllium, titanium and the like.

The basal laminate aforedescribed may be employed per se or may be duplicated thicknesswise of the sheet-material to any desired extent or number of times in order to meet varying vibratile or thermal, etc., conditions. Instead of a double-faced adhesive tape, the first said laminate may consist of a pure layer of the present pseudoplastic material having a low yield value and high internal molecular friction and which is a vibration distortable and recuperative pressurally adhesive sound-damping material, without the usual base or backing layer of paper or fabric found in the double-faced tape aforementioned.

With these prerequisites met, any desired combination of a lamina of sound damping and thermally non-conductive material and a lamina of non-flowable, semi-rigid stress-absorbing material may be laminated "sandwich-style" and applied as above in order to achieve the present objectives. Sandwiching of a plurality of these laminae, however, produces a series of thicknesswise adjacent, segregated but successively cooperative sound damping and heat insualting cells of flowable, energy-dissipating material, the cells being spaced apart by metallic, or semi-rigid, shear and flexure plates arranged to increase the structural, acoustic and thermal effectiveness of the sheet-material.

According to one of the several modes of application of the material of the invention, now contemplated, a layer of the pressure-sensitive adhesive may be directly applied facewise to the inner surface of the skin of a fuselage. A layer of fabric or other web material may then be pressurally applied facewise to the first layer, followed by a coextensive layer of pressurally adhesive material identical with the first layer. On the exposed face of this pressurally-adhesive material is pressurally applied a layer of a solid, nonflowable, ductile material such as a metallic foil. However, in the preferred mode of fabricating the sheet material per se, as an article of manufacture, the metallic foil is spread upon the work-table, whereafter a lamina of pressurally-adhesive viscous material is applied to the one face of the foil. Thereafter, a web-material such as a textile fabric is facewise attached to the lamina. On the exposed face of the web-material is attached another of the laminae of viscous material, completing the article.

In any of these cases, it is manifest that the invention provides the combination with a first lamina of solid, unflowable material so thin as to be incapable of sustaining itself in planeal form and a second lamina of pressurally-adhesive, viscous material pressurally united by its one face to the one face of the first lamina; of an expanse of vibratile material united facewise to the opposite face of the second lamina so as to damp the vibrations of that portion of the vibratile expanse to which said laminae are united.

In all cases, when the vibratile panel flexes under vibratory forces with the novel sheet-material attached facewise thereto, such flexures effect temporary distortion, in all three planes of space, of the laminae of flowable, pressurally-adhesive material of high internal molecular friction, causing this novel material to do considerable work. This working dissipates the flexural and other vibratile energy of the panel and thereby minimizes sound transmission therethrough.

It will be apparent that subject sheet material is quite suitable for sound-insulating the fuselages of aircraft, but that it is by no means limited in the scope of its utility to such environment.

Although the sheet material preferably takes the form of a roll, for the reasons pointed out hereinabove and hereinafter, it is also contemplated to supply the material in the form of individual, planeal sheets, stacked and handled in vertical piles and made to a series of predetermined lengths and widths for individual facewise application to the panel to be protectively or dampingly faced off.

As will become apparent, it is also within the scope of the present concepts to apply the present facing material by spraying alternate layers of acoustic-pressure deformable, pseudoplastic which is an energy-dissipating and adhesive material and of non-flowable, stress-absorbing, more rigid material on the one face of the surface to be ameliorated.

In order to further clarify the invention, these and other embodiments thereof are shown in the accompanying drawing and will be described in detail in conjunction with said drawing.

Figure 1:
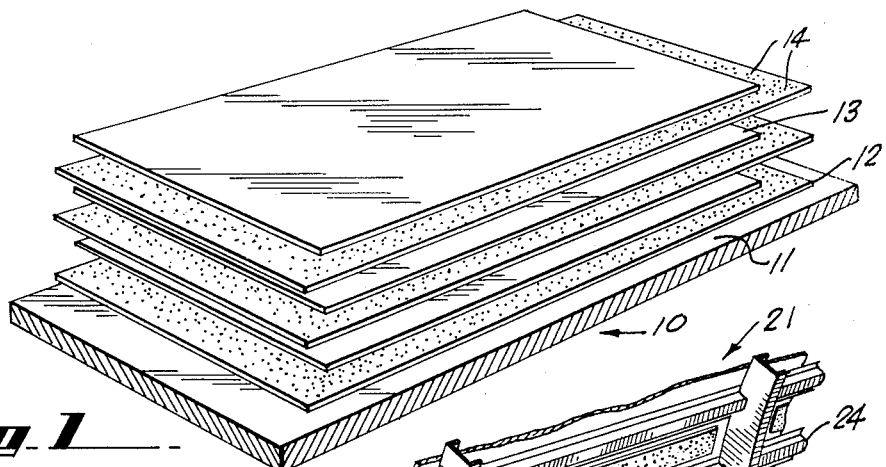
Figure 1 is an expanded perspective view of a multiple-laminae form of the invention, the separated laminae being arranged facewise adjacent a panel that is to be faced-off, or "lined," thereby.
Figure 2:
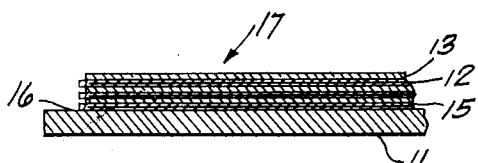
Figure 2 is a longitudinal section of a panel faced-off, or "lined" with a multiple-layer sheet of the present sheet-material.
Figure 3:
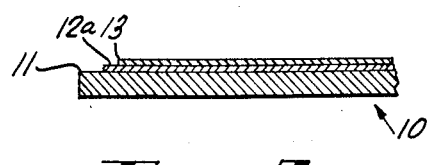
Figure 3 is a fragmentary longitudinal section of a panel faced-off with a sheet composed of the minimum number of layers each according to the present invention.

The multiple layered form of the invention which is shown in Figures 1 and 2 constitutes a highly effective form of the invention, although not the simplest configuration thereof that is usable, that form being shown in Fig. 3.

In Figures 1 and 2, a panel 10 has its inner face 11 partially or completely covered with an expanse of the novel sheet material constituted by laminae 12 alternating with, and united to, laminae 13. The laminae 12 may or may not be coextensive with the face 11 of the panel but in either event, consist of double-faced adhesive tape, that is, web-material 15 coated on its opposite faces with an acoustic-pressurally flowable pseudoplastic having high surface tension, and high internal friction material 16 which has the property of deforming under the action of the vibration of the panel 10 and thereby doing mechanical work. Such working dissipates the energy of the panel vibrations without transmitting them either in the thicknesswise direction or the lengthwise direction of the sheet-material. At the same time, the material of the layers 16 may be of such a nature as to be "tacky" at room temperatures and hence may consist of a pressure sensitive adhesive.

Among the materials possessing the foregoing properties may be mentioned the Johnson and Johnson product referred to above.

The laminae 13 consist of sheets of a ductile material which is normally or intrinsically of a rigid nature but here attenuated or thinned to such an extent as to be pliant or non-selfsustaining. Preferably, also, this material is reflective of light and radiant heat and is oxidation and corrosion resistant to a certain degree and is sufficient to protect the layer 12 from oxidation and deterioration.

Among the materials suitable for the laminae 13 may be mentioned aluminum foils of very thin gage, a few thousandths of an inch in thickness.

These laminae 13 in some cases are not coextensive with the laminae 12, as clearly shown in Figures 1 and 2 and thus, among other things, serve to restrict the area of the adjacent laminae 12 that undergoes work, thereby to establish a peripheral margin 14 on lamina 12 that serves undisturbedly to fasten the laminae to each other thickenesswise at these margins and to the panel. The metal foil when the unit is united to the skin takes the flexural stresses of the material and also serves as shear-resisting plates to take the longitudinally acting forces tending to cause separation of the laminae. The innermost lamina, if of metal foil, many also serve as light or radiant heat reflectors, as do all the metal foil layers whether exposed directly to the radiant heat energy or not.

The "sandwich" shown in Figures 1 and 2 thus consists in effect of a plurality of "damping-cells," successive laminae 13 and energy absorbing cells 12 and the successive cells, proceeding from the panel inwardly, decrementally reduce the acoustic energy of vibration of panel 10 substantially to zero, so as to minimize the noise below auditory levels, which is the primary purpose of the invention, although it is manifest that it also serves to reduce heat transmission. In the latter function, the layers 12 minimize heat-conduction and the layers 13 reduce transmission of radiant-energy heat.

The metal foil laminae 13, being of a thickness of the order of a few thousandths of an inch, are so thin as to be non-selfsustaining, being incapable, alone, of withstanding the slightest distortional forces applied thereto, particularly flexural forces causing "buckling," and torsional forces. They hence cannot maintain themselves in a planeal condition. However, when, by means of the laminae 12, they are connected stresswise with the more rigid vibratile panel, they partake of the rigidity of the vibratile panel and, in combination with the adhesive laminae, resist the flexural displacements of the vibratile panel. In themselves, they then locally resist flexures, shears and other stresses applied thereto by the distorting laminae 13 and aid the adhesive layers to return to their original dimensions and shapes after the latter undergo temporary distortion.

Thus, in combination, the foil-laminae 12 and the vibratile panel react beneficially on each other to enable the adhesive laminae 13 to undergo their panel damping distortion without permanent deformation, set, or rupture occurring in the latter.

In addition, the laminae 13, being impervious, inert and substantially non-corrodible, act to protect the adhesive, and substantially blanket the working area of the adhesive laminae, from oxidation, disassociation and deterioration while binding the adhesive particles in a unified mass.

In Figure 3 there is shown the simplest form to which the invention can employably be reduced. This modification of the invention is particularly applicable to thick panels 10 or those subjected to acoustic wave impingement in which the amplitude of the wave-vibrations is relatively small. It essentially comprises a single lamina 12, which can consist solely of the flowable and dimensionally recuperative vibration damping material, minus the web-material, but may alternatively consist of the same double-faced tape 12 as is shown in Figures 1 and 2.

In either case, lamina 12a is united facewise to the inner face 11 of the panel 10; and a single lamina 13 of the metallic foil, as above described, here shown as not quite coextensive in area with that of the lamina 12 is also employed. Under the circumstances mentioned, this configuration serves the same functions as that of Figures 1 and 2.

Thus the configuration of Figures 1 and 2 is simplified while retaining most if the advantages of the invention, in that the doublefaced adhesive tape may be substituted by a single layer of pressure-sensitive adhesive material without the paper or cloth of the tape, this layer then being spread or sprayed facewise on the one face of the metallic foil, the adhesive material being either rendered coextensive with the face of the metallic foil, or, as shown in Figure 3, extending outwardly beyond each of the edges of the foil in order to insure proper attachment of the margin of the foil.

Figure 4:
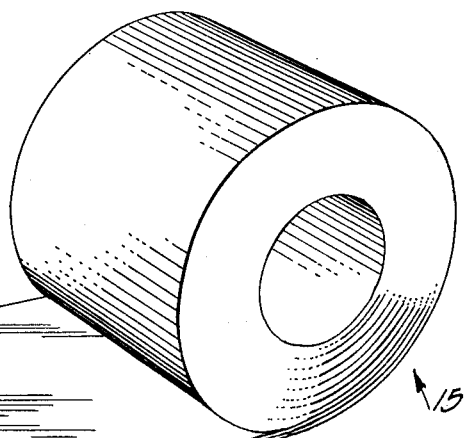
Figure 4 is a perspective view of the novel sheet of Figure 3 as put up in roll form to adapt it to multifarious uses in various environments and with various sizes of panels and the like to be "lined"
Figure 4:
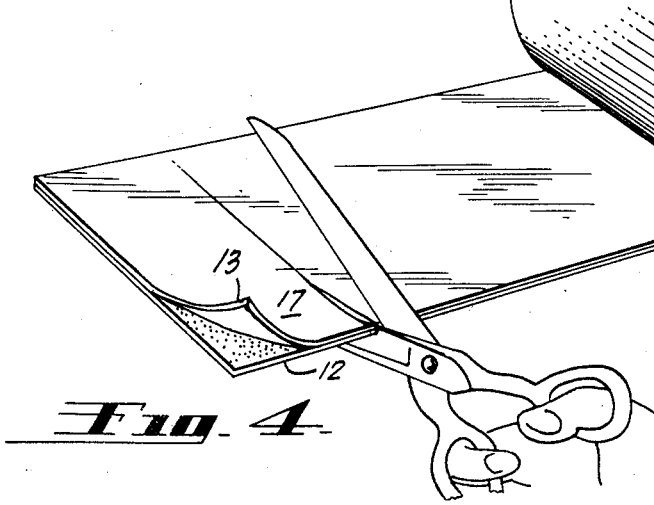

This form of the invention is especially well adapted for putting up in compact roll form, as shown in Figure 4, whereas the form of Figures 1 and 2 lends itself primarily to storage and sale stacked in sheet-form, its multiply nature rendering it rather more bulky and cumbersome, when rolled, than the form of Figure 3.

As shown in Figure 4, the novel sheet-material 17 is convoluted into a roll with the "tacky" face of the lamina 12 lying on the outside of the roll to facilitate application by merely unrolling the roll in contact with the panel. In the roll, this face does not press hard enough against the adjacent metallic foil of the roll to cause the adhesive and metallic faces to permanently adhere, so that the new article of manufacture can be "stocked" for long periods and still remain salable. If desired the roll may be made up with the tacky surface facing in instead of out.

A method of fabricating the new article of commerce shown in Figure 4 can well consist of first taking the thin heat reflective, lamina of metallic foil; spreading on the one face thereof a lamina of the flowable, thermally non-conductive pressurally adhesive material of high internal molecular friction; pressurally uniting to the exposed face of the pressurally-adhesive lamina, the one face of a lamina of web-material serving as a backing or base for further amounts of the pressurally-adhesive material; and spreading over the exposed face of said web-material another lamina of the acoustic-pressure deformable, pressurally-adhesive material of high molecular friction.

Thereafter, the laminated band or sheet is compactly convoluted to form an easily portable and handleable and severable roll of facing material.

Because of the easily severable nature of the novel sheet-material, it is suitable for use in portions less than the entire extent of the roll and, as shown in Figure 4, may be segmented into portions "tailored" to fit panels, and other surfaces to be faced-off or lined for any or all of the present purposes, which vary widely in areas. Thereby the novel sheet-material is adapted for a widespread variety of engineering uses.

It is to be understood that in addition to its other functions, the metallic foil serves to protect the layer of adhesive from oxidation and deterioration.

It is also to be understood that the sheet material preferably occupies less than the entire area of the face of the panel to which it is attached, being preferably coextensive with the central region only of the panel, since this region undergoes the greatest amount of vibration.

Figure 5:
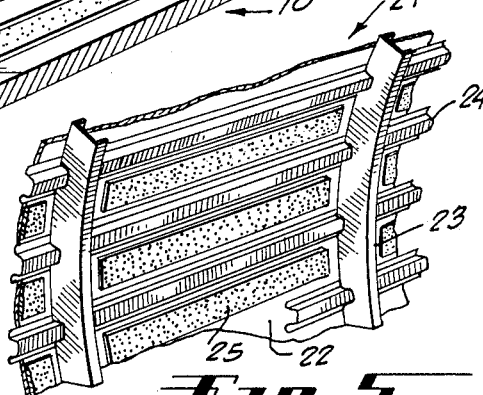
Figure 5 is a fragmentary perspective view, partly in section, of an airplane fuselage provided with the present facing-material.

In Figure 5 there is shown a portion of an aircraft fuselage, which, as is well known, is subjected to vibrations of audio-frequency and is exposed to conductive and radiant-energy heat, both on its inner and on its outer surfaces. In order to reduce the level of acoustic transmission into the interior of the fuselage and to inhibit heat transfer into or out of the fuselage through the skin, the present sheet material is pressurally attached to the inner face of the skin.

As is the case with most airplane fuselages, the present fuselage 21 is a framed structure, including a stressed skin 22 supported by a framework made up of annular bulkheads 23 attached at their outer, or larger, peripheries to the inner face of the skin at longitudinally spaced intervals. Longitudinally extending, circumferentially, or peripherally, spaced stringers 24 are attached to the inner face of said skin at generally equi-spaced peripheral locations thereof and pass through the bulkheads as shown.

Between each pair of adjacent stringers, and extending longitudinally between each pair of adjacent bulkheads is a strip, or oblong 25 in this case, of the laminated sheet-material of the present invention. The oblong is facewise attached to the inner face of the skin. The attachment is effected by means of the exposed, pressurally adhesive face of the strip, as aforedescribed. The strip may be coextensive with the central region of the skin-surface that lies between adjacent bulkheads and stringers since that is the region of greatest amplitude of vibration of the skin. If it is desired to also thermally insulate the fuselage however, the strips are precisely coextensive with the entire area of these spaces.

Although certain specific compositions have been chosen from among those suitable for the present purposes, it is to be understood that this choice is merely exemplificatory and by no means limits the scope of the invention, which is defined in the annexed claim.

We claim:

In an airplane having a fuselage including a plurality of spaced longitudinal and circumferential brace members constituting a multiplicity of frames and a stressed skin covering of relatively thin but stiff metallic sheets attached to and traversing said frames, the skin portion traversing a frame being subject to forces normally productive of vibration in said skin portion wherein said vibration, unless inhibited, would cause the development of sound waves in the audible range directed toward the interior of the fuselage, the combination with such skin portion of: a damping panel attached in intimate contact with said skin portion, said panel being comprised of a sheet of metallic foil, said sheet per se having substantial strength in shear, compression and tension but substantially no resistance to bending or buckling, and a layer of pseudo-plastic pressure sensitive adhesive material on one face of said foil sheet, said material being permanently soft and permanently tacky and being subject to substantial internal working when yieldably deformed; said damping panel being attached to and carried by said skin portion solely by the pressural adhesion of said adhesive material; such adhesion bonding said foil sheet to said skin portion in parallelism therewith and preventing buckling or independent bending of said foil sheet and effectually providing a unitary damping construction of said panel and said skin portion to inhibit the production of sound waves in the audible range.

References Cited in the file of this patent

UNITED STATES PATENTS

| | | |
|---|---|---|
| 1,137,278 | Peterson | Apr. 27, 1915 |
| 1,827,743 | Groehn | Oct. 20, 1931 |
| 1,852,146 | Carns et al. | Apr. 5, 1932 |
| 1,909,862 | Honegger | May 16, 1933 |
| 1,956,323 | Gregg | Apr. 24, 1934 |
| 1,963,416 | Minshall | June 19, 1934 |
| 1,972,005 | Berbeck | Aug. 28, 1934 |
| 1,991,832 | Zand | Feb. 19, 1935 |
| 2,003,494 | Reynolds | June 4, 1935 |
| 2,032,845 | Humphner | Mar. 3, 1936 |
| 2,065,402 | Schweller | Dec. 22, 1936 |
| 2,254,152 | Klemm | Aug. 26, 1941 |
| 2,362,951 | Wallis | Nov. 14, 1944 |
| 2,607,709 | Simpson et al. | Aug. 19, 1952 |
| 2,650,185 | Larson et al. | Aug. 25, 1953 |

FOREIGN PATENTS

| | | |
|---|---|---|
| 348,600 | Great Britain | May 6, 1931 |
| 459,980 | Great Britain | Jan. 19, 1937 |
| 465,782 | Great Britain | May 10, 1937 |